(12) United States Patent
Dixit et al.

(10) Patent No.: US 6,414,592 B1
(45) Date of Patent: Jul. 2, 2002

(54) TIRE CONDITION SENSOR COMMUNICATION WITH TIRE LOCATION PROVIDED VIA MANUALLY INPUTTED UPDATE

(75) Inventors: Rahul Dixit, Farmington Hills; Timothy DeZorzi, South Lyon, both of MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/752,951

(22) Filed: Jan. 2, 2001

(51) Int. Cl.[7] ............................................. B60C 23/00
(52) U.S. Cl. ..................... 340/447; 73/146.5; 340/442; 340/445
(58) Field of Search ..................... 73/146.5; 340/442, 340/445, 447; 200/61.22

(56) References Cited

U.S. PATENT DOCUMENTS

| | | | | |
|---|---|---|---|---|
| 5,109,213 A | * | 4/1992 | Williams | 340/447 |
| 5,301,553 A | | 4/1994 | Schultz et al. | 73/146.5 |
| 5,463,374 A | | 10/1995 | Mendez et al. | 340/447 |
| 5,473,938 A | * | 12/1995 | Handfield et al. | 340/445 |
| 5,600,301 A | | 2/1997 | Robinson, III | 340/442 |
| 5,612,671 A | | 3/1997 | Mendez et al. | 340/447 |
| 5,731,516 A | * | 3/1998 | Handfield et al. | 73/146.5 |
| 5,731,754 A | * | 3/1998 | Lee, Jr. et al. | 340/447 |
| 5,748,076 A | | 5/1998 | Horie | 340/442 |
| 5,838,229 A | | 11/1998 | Robinson, III | 340/442 |
| 5,864,580 A | * | 1/1999 | Lowe et al. | 375/222 |
| 5,880,363 A | | 3/1999 | Meyer et al. | 340/445 |
| 5,960,844 A | * | 10/1999 | Hamaya | 340/447 |
| 6,034,596 A | * | 3/2000 | Smith et al. | 340/447 |
| 6,087,930 A | * | 7/2000 | Kulka et al. | 340/447 |
| 6,243,007 B1 | * | 6/2001 | McLaughlin et al. | 340/447 |
| 6,278,363 B1 | * | 8/2001 | Bezek et al. | 340/442 |

OTHER PUBLICATIONS

Brochure from AVCO Precision Products Division, entitled "Tyrechek Low Tire Pressure Monitoring & Warning System", and having a lithography ID 473.
An internet press release from Siemens Automotive dated Jan. 24, 2001.

* cited by examiner

Primary Examiner—Brent A. Swarthout
(74) Attorney, Agent, or Firm—Tarolli, Sundheim, Covell, Tummino & Szabo L.L.P.

(57) ABSTRACT

A tire condition communication system (10) and method for a vehicle (12) that has a tire (e.g., 14A). A sensor (70), associated with the tire (e.g., 14A), senses at least one tire condition. A memory (66), associated with the tire (e.g., 14A), holds an identification. A transmitter arrangement (22 and 74), associated with the tire (e.g., 14A), transmits a signal (e.g., 24A) that indicates the held identification and the sensed tire condition. A receiver arrangement (28 and 30), associated with the vehicle (12), receives the transmitted signal (e.g., 24A). An identification update device is associated with the tire and is operatively connected to the memory (66). The update device receives an update identification and provides the received location identification to the memory (66) to be held as the held identification. An input device is manually actuated to provide the update identification. In one example, a receiver (46) at the tire and a manually actuated transmitter (44) provided the update and input devices. In another example, a switch (116) and a manually actuatable part (e.g., a valve stem part) at the tire provide the update and input devices.

13 Claims, 3 Drawing Sheets

TIRE CONDITION SENSOR COMMUNICATION WITH TIRE LOCATION PROVIDED VIA MANUALLY INPUTTED UPDATE

TECHNICAL FIELD

The present invention relates to a tire condition monitoring system for providing indication of a tire operation parameter, such as tire inflation pressure, to a vehicle operator. The present invention relates specifically to a tire condition monitoring system that provides ready identification of a tire providing condition information and avoids misidentification due to previous tire position change via tire position rotation or the like.

BACKGROUND OF THE INVENTION

Numerous tire condition monitoring systems have is been developed in order to provide tire operation information to a vehicle operator. One example type of a tire condition monitor system is a tire: pressure monitor system that detects when air pressure within a tire drops below a predetermined threshold pressure value.

There is an increasing need for the use of tire pressure monitoring systems due to the increasing use of "run-flat" tires for vehicles such as automobiles. A run-flat tire enables a vehicle to travel an extended distance after significant loss of air pressure within that tire. However, a vehicle operator may have difficulty recognizing the significant loss of air pressure within the tire because the loss of air pressure may cause little change in vehicle handling and visual appearance of the tire.

Typically, a tire pressure monitoring system includes a pressure sensing device, such as a pressure switch, an internal power source, and a communications link that provides the tire pressure information from a location at each tire to a central receiver. The central receiver is typically connected to an indicator or display located on a vehicle instrument panel.

The communications link between each tire and the central receiver is often a wireless link. In particular, radio frequency signals are utilized to transmit information from each of the tires to the central receiver. However, in order for the central receiver to be able to proper associate received tire pressure information with the tire associated with the transmission, some form of identification of the origin of the signal must be utilized. Such a need for identification of the origin of the transmitted tire information signal becomes especially important subsequent to a tire position change, such a routine maintenance tire position rotation.

SUMMARY OF THE INVENTION

In accordance with one aspect, the present invention provides a tire condition communication system for a vehicle that has a tire. Sensor means, associated with the tire, senses at least one tire condition. Memory means, associated with the tire, holds an identification. Transmitter means, associated with the tire and operatively connected to the sensor means and the memory means, transmits a signal that indicates the held identification and the sensed tire condition. Receiver means, associated with the vehicle, for receives the transmitted signal indicative of the held identification and the sensed tire condition. The system includes manually actuated input means, associated with the tire and operatively connected to the memory means, for inputting an update identification to be held by the memory means as the held identification.

In accordance with another aspect, the present invention provides a method of communicating information within tire condition monitoring system for a vehicle that has a tire. An input means is manually actuated to input update identification information for a tire condition sensor unit located at the tire. The input identification is held at the tire condition sensor unit. A tire condition is sensed via operation of the tire condition sensor unit. A signal is transmitted from the tire condition sensor unit, wherein the transmitted the signal indicates the held identification and the sensed tire condition. The transmitted signal is received at a location on the vehicle.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF EXAMPLE EMBODIMENTS

Figure 1:
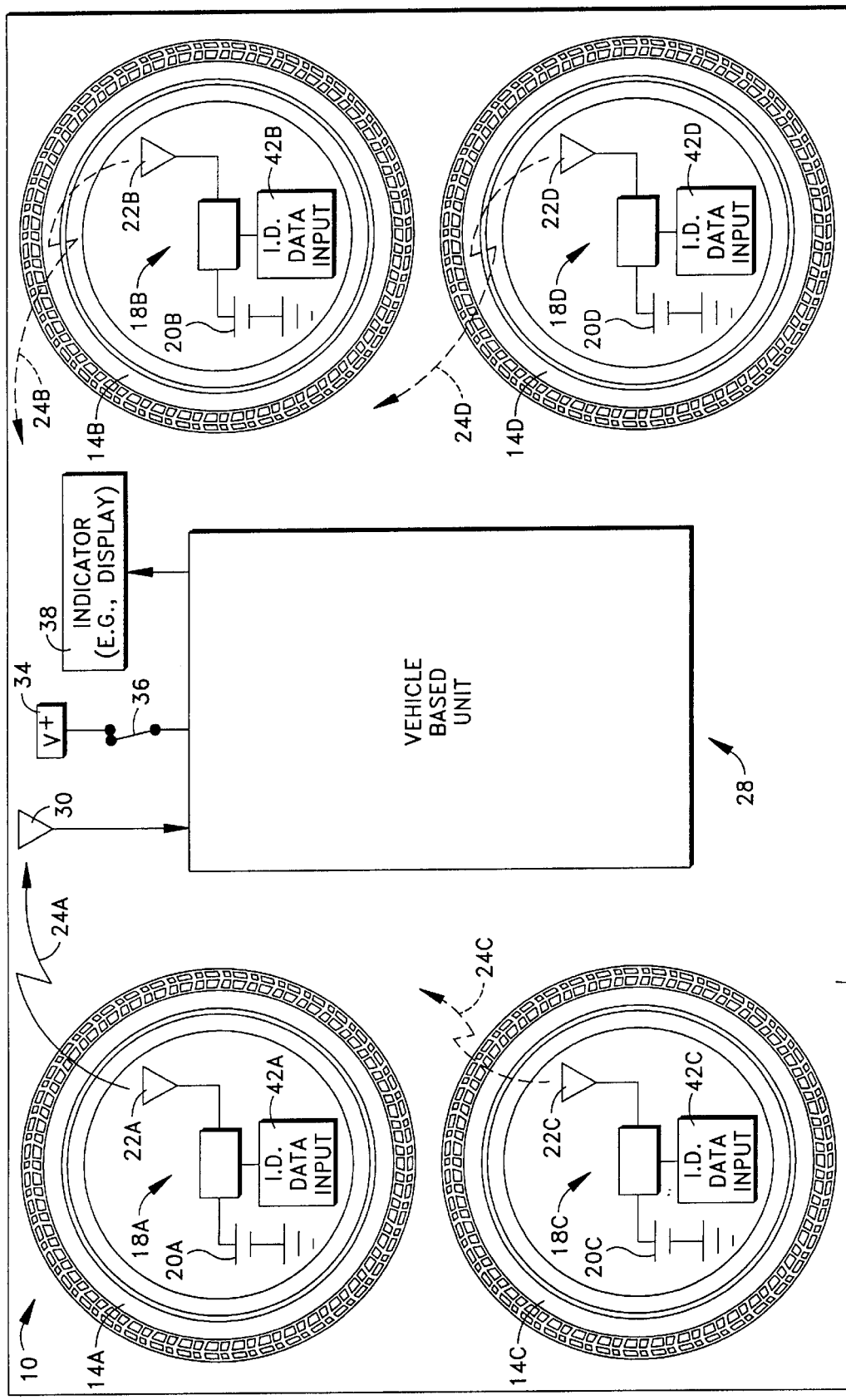
FIG. 1 is a schematic block diagram of a vehicle that contains a tire condition communication system in accordance with the present invention.

A tire condition communication system 10 is schematically shown within an associated vehicle 12 in FIG. 1. The vehicle 12 has a plurality of inflatable tires (e.g., 14A). In the illustrated example, the vehicle 12 has four tires 14A–14D. It is to be appreciated that the vehicle 12 may have a different number of tires. For example, the vehicle 12 may include a fifth tire (not shown) that is stored as a spare tire.

The system 10 includes a plurality of tire condition sensor units (e.g., 18A) for sensing one or more tire conditions at the vehicle tires (e.g., 14A). Preferably, the number of tire condition sensor units 18A–18D is equal to the number of tires 14A–14D provided within the vehicle 12. In the illustrated example, all of the tire condition sensor units 18A–18D have the same components. Identical components are identified with identical reference numbers, with different alphabetic suffixes. It is to be appreciated that, except as noted, all of the tire condition sensor units 18A–18D function in the same manner. For brevity, operation of one of the tire condition sensor units (e.g., 18A) is discussed in detail with the understanding that the discussion is generally applicable to the other tire condition sensor units (e.g., 18B–18D).

Each tire condition sensor unit (e.g., 18A) includes a power supply (e.g., a battery 20A) that provides electrical energy to various components within the respective sensor unit. The electrical energy enables the tire condition sensor unit (e.g., 18A) to energize a radio frequency antenna (e.g., 22A) to emit a radio frequency signal (e.g., 24A) that conveys one or more sensed conditions along with a fixed identification to a central, vehicle-based unit 28.

A radio frequency antenna 30 receives the tire condition signal (e.g., 24A) from the tire condition sensor unit (e.g., 18A) and the conveyed information is processed. In one example, the system 10 is designed to operate with the tire condition signals 24A–24D in the FM portion of the radio frequency range. Each antenna (e.g., 22A) in conjunction with the antenna 30 comprises part of a means for communication from the respective tire condition sensor unit (e.g., 18A) to the vehicle-based unit 28.

A power supply (e.g., a vehicle battery) 34, which is operatively connected (e.g., through a vehicle ignition switch 36) to the vehicle-based unit 28, provides electrical energy to permit performance of the processing and the like. The vehicle-based unit 28 utilizes the processed information to provide information to a vehicle operator via an indicator device 38. In one example, the indicator device 38 may be a visual display that is located on an instrument panel of the vehicle 12. Accordingly, the vehicle operator is apprised of the sensed condition(s) at the tire (e.g., 14A).

It is to be noted that the sensed condition may be any condition at the tire (e.g., 14A). For example, the sensed condition may be inflation pressure of the tire (e.g., 14A), temperature of the tire, motion of the tire, or even a diagnostic condition of the tire condition sensor unit (e.g., 18A) itself.

It should be noted that a single antenna of the vehicle-based unit 28 receives all of the tire condition signals 24A–24D from a plurality of tire condition sensor units 18A–18D. In order for the vehicle-based unit 28 to accurately "know" which tire (e.g., 14A), via the associated tire condition sensor unit (e.g., 18A), is providing the tire condition signal (e.g., 24A), the tire condition signal conveys an identification of the tire. In order for the tire condition sensor unit (e.g., 18A) to output the tire condition signal (e.g., 24A) with an identification of the tire, the identification is provided to the tire condition sensor unit.

The provision of the location identification to the respective tire condition sensor unit is accomplished by the system 10 including a manually actuated identification data input arrangement (e.g., 42A) for the respective tire condition sensor unit (e.g., 18A). In the illustrated example of FIG. 1, a plurality of manual input arrangements 42A–42D are provided, with each manual input arrangement (e.g., 42A) being associated with a different tire condition sensor unit (e.g., 18A).

A different identification value is associated with each specific tire mounting location. Typically, the tire mount locations on a vehicle are identified as right-front, right-rear, left-front, left-rear, and spare mount locations. When a tire (e.g., 14A) is located at a certain tire mounting location, the identification associated with that location is manually input via the manual input arrangement (e.g., 42A). For example, when the locations of the tires 14A–14D are changed, such as during a routine maintenance tire rotation, a new location identification is manually input for each tire.

The tire condition sensor unit (e.g., 18A) utilizes the manually input location identification as the identification that is transmitted within its tire condition signal (e.g., 24A) sent to the vehicle-based unit 28. The vehicle-based unit 28 is programmed (e.g., taught) or has learned to recognize the location identifications for the various tire mount locations on the vehicle. Accordingly, when the vehicle-based unit 28 receives a tire condition signal (e.g., 24A) that contains a certain location identification, the vehicle-based unit will interpret the signal as originating from a tire located at that vehicle mount location.

Figure 2:
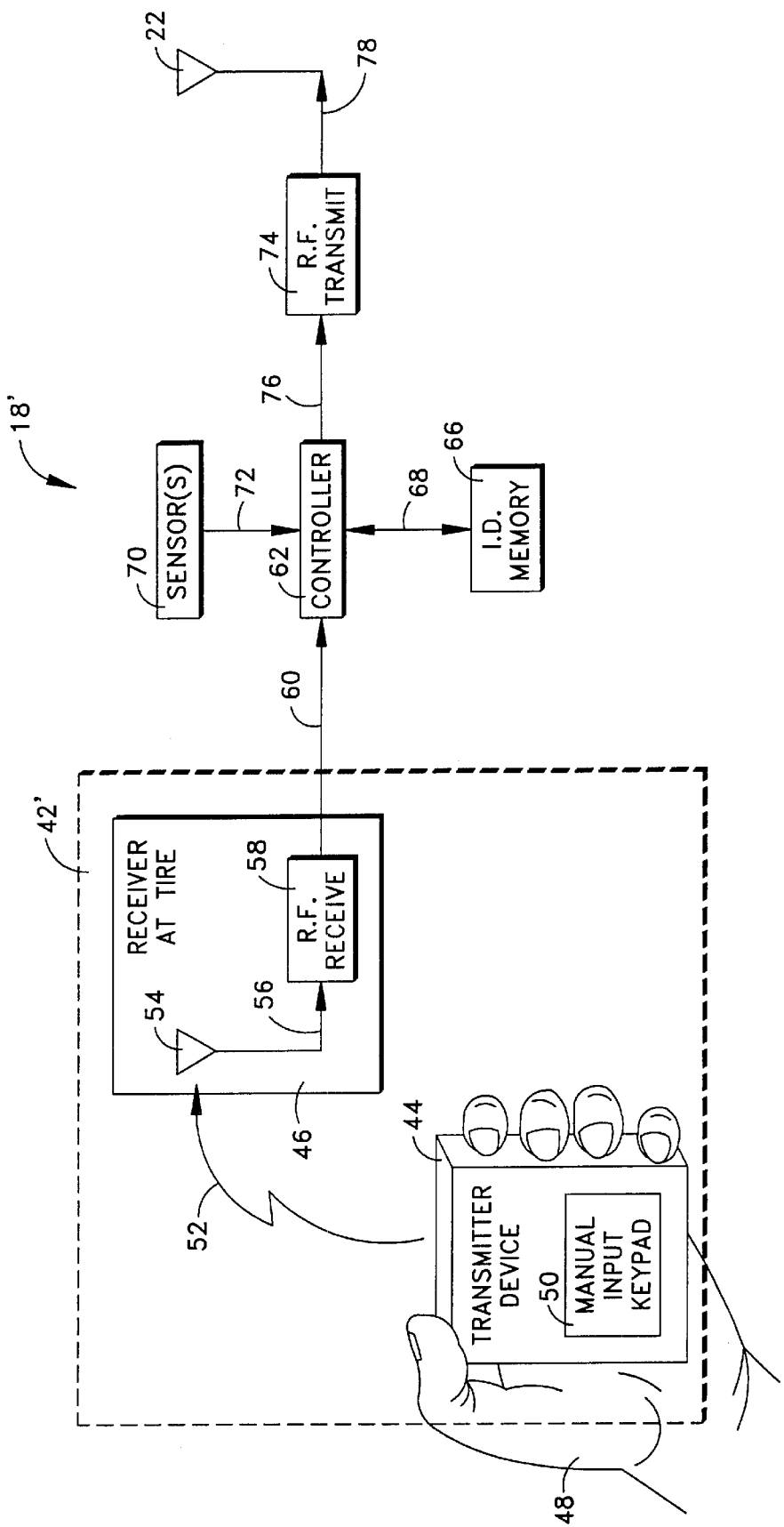
FIG. 2 is a schematic function block diagram of a first embodiment of a tire condition sensor unit and an associated first embodiment of a manually actuated identification update arrangement.

It is contemplated that the manual input of location identification data for use by the associated tire condition sensor unit(e.g., 18A) may be accomplished by different methods, formats, etc. FIG. 2 illustrates a first example of a tire condition sensor unit 18' and an associated manual input arrangement 42'.

It is to be noted that the tire condition sensor unit 18' and the manual input arrangement 42' are indicated using reference numerals with primes, to signify that the examples are for a first specific discussion. Also, it is to be noted that the tire condition sensor unit 18' and the manual input arrangement 42' are indicated without use of alphabetic suffixes to signify that the examples are generic to all of the tire condition sensor units and all of the identification provision units, respectively.

The manual input arrangement 42' includes a manually actuatable radio frequency transmitter device 44, located remote from the tire (e.g., 14A), and a radio frequency receiver 46, located at the tire. In one example, the receiver 46 is located within the tire (e.g., 14A) with the associated tire condition sensor unit 18'.

The transmitter device 44 is preferably a hand-held unit that a person 48 (e.g., a service technician) manually operates to inputs an identification code via an input keypad 50 on the hand-held transmitter device. The transmitter device 44 outputs a radio frequency signal 52 that conveys the input identification code and that is intended for reception by an antenna 54 of the receiver 46 at the tire (e.g., 14A).

The antenna 54 is operatively connected 56 to RF receive circuitry 58 of the receiver 46. In turn, the RF receive circuitry 58 is operatively connected 60 to a controller 62 of the tire condition sensor unit 18'. When the antenna 54 receives the radio frequency signal 52 that conveys an update location identification, an electrical stimulus signal is provided by the antenna to the RF receive circuitry 58. In turn, data bits that represent the location identification are provided to the controller 62. A location identification memory 66 is operatively connected 68 to the controller 62. The controller 62 provides the update location identification data to the memory 66 for storage therein.

One or more condition sensors 70 are operatively connected 72 to the controller 62. RF transmit circuitry 74 is operatively connected 76 to the controller 62 and operatively connected 78 to the associated antenna 22. In order to provide the tire condition signal (e.g., 24A) for reception by the vehicle-based unit 28, the controller 62 receives sensory information from the sensor(s) 70 and receives the location identification from the memory 66. The controller 62 assembles a message packet that contains the identification location and the sensory information and provides the message packet to the RF transmit circuitry 74. In turn, the RF transmit circuitry 74 provides a stimulus electrical signal to the antenna 22 such that the tire condition signal (e.g., 24A) is emitted.

It is to be noted that the hand-held transmitter device 44 may be a device that can sequentially communicate with all of the tire condition sensor units 18A–18D of the system 10 at the vehicle 12, thus, avoiding the need to have a separate transmitters for each tire condition sensor unit. Moreover, the hand-held transmitter device 44 may be utilized to communicate with tire condition sensor units within different tire condition communication systems at different vehicles. In other words, the transmitter device may be a generic or universal tool used to program location identification to various tire condition sensor units.

Figure 3:
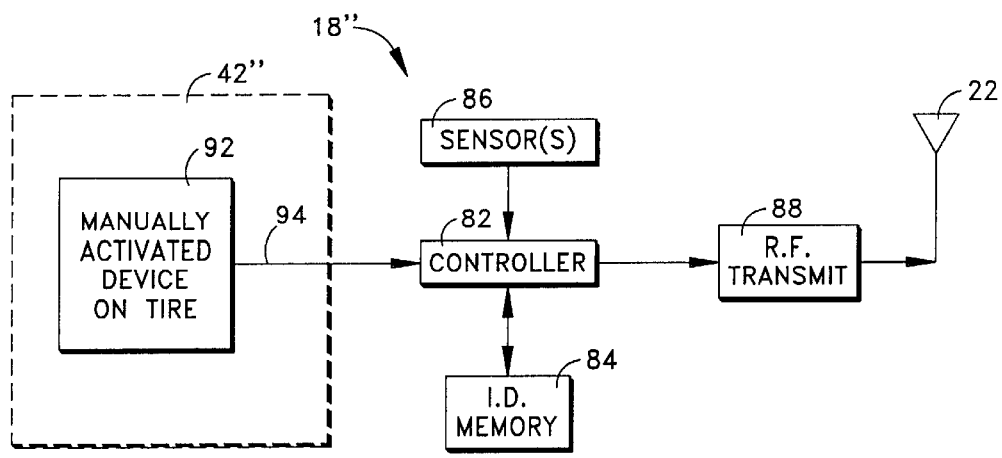
FIG. 3 is a schematic function block diagram of a second embodiment of a tire condition sensor unit and an associated second embodiment of a manually actuated identification update arrangement.

FIG. 3 schematically illustrates another example of a tire condition sensor unit 18" with an associated manual input arrangement 42". It is to be noted that the tire condition sensor unit 18" and the manual input arrangement 42" are indicated using reference numerals with double primes, to signify that the examples are for a second specific discussion. Also, it is to noted that the tire condition sensor unit 18" and the manual input arrangement 42" are indicated without use of alphabetic suffixes to signify that the examples are generic to all of the tire condition sensor units and all of the identification provision units, respectively.

The tire condition sensor unit 18" includes a controller 82, a location identification memory 84, one or more sensors 86, and RF transmit circuitry 88 similar to the embodiment shown in FIG. 2. The identification memory 84, the sensor (s) 86, and the RF transmit circuitry 88 are operatively connected to the controller 82 similar to the embodiments shown in FIG. 2.

In the embodiment shown in FIG. 3, the manual input arrangement 42" includes a manually actuated device 92 located on the tire (e.g., 14A) that is operatively connected 94 to the controller 82. The device 92 may be any device that is manually actuated to input information (e.g., a string of data bits) to the controller 82.

Figure 4:
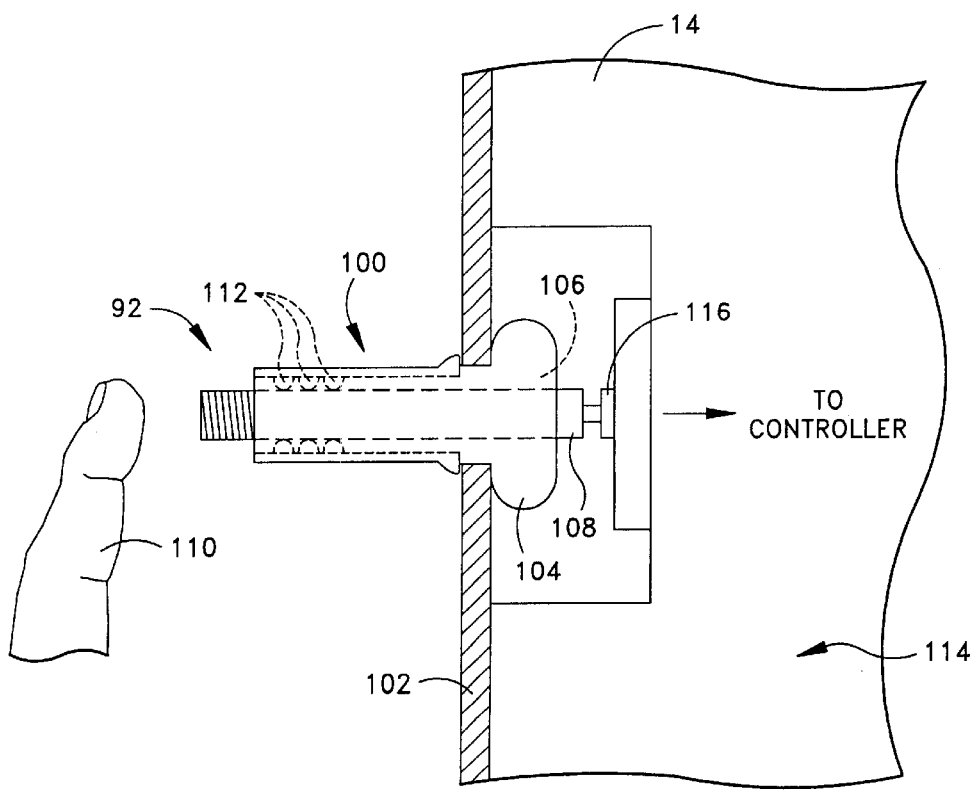
FIG. 4 is a partial cross-section of a tire that contains an identification input device in accordance with the embodiment the identification update arrangement of FIG. 3.

FIG. 4 illustrates one example of the manually actuable device 92 that is utilized to input location information. Specifically, the device 92 is partially integrated into an inflation valve stem assembly 100 utilized to supply air pressure into the tire 14. The stem assembly 100 is mounted onto a rigid metal wheel side wall 102. A first portion 104 of the stem assembly 100 provides a mounting arrangement and engages the side wall 102 to provide an air tight sealing arrangement with the side wall. The first portion 104 is hollow and provides a passageway 106 for air flow into the tire 14.

A second portion 108 of the stem assembly 100 is movable relative to the first portion 104 when the second portion is manually depressed by a person (e.g., a technician) 110. One or more sealing devices (O-rings) 112 seal against air pressure loss between the first portion 104 of the stem assembly 100 and the second portion 108 of the stem assembly.

In the illustrated example, the second portion 108 extends the length of the stem assembly 100 and protrudes into the pressurized interior 114 of the tire 14. A micro-switch 116 is engaged with an end of the second portion 108 within the tire interior 114. When the second portion 108 of the stem assembly 100 is pressed via manual actuation, the second portion moves sufficiently far to toggle the micro-switch 116. Each push results in one toggling of the micro-switch 116. The micro-switch 116 is operatively connected to the controller 82 such that the toggling of the micro-switch is supplied as an input to the controller. Accordingly, data is entered by a sequence of pushes on the second portion 108 of the stem assembly 100 to repeatedly toggle the micro-switch 116. The controller interprets the toggles of the micro-switch to derive an input location identification value, and supplies the value to the memory for storage therein.

From the above description of the invention, those skilled in the art will perceive improvements, changes and modifications. Such improvements, changes and modifications within the skill of the art are intended to be covered by the appended claims.

Having described the invention, the following is claimed:

1. A tire condition communication system for a vehicle that has a tire, said system comprising:

sensor means, located within the tire, for sensing at least one tire condition;

memory means, located within the tire, for holding an identification;

transmitter means, located within the tire and operatively connected to said sensor means and said memory means, for transmitting a signal that indicates the held identification and the sensed tire condition;

receiver means, associated with the vehicle, for receiving the transmitted signal indicative of the held identification and the sensed tire condition;

manually actuatable input means, located on the exterior surface of the tire and operatively connected to said memory means, for inputting an update identification to be held by said memory means as the held identification wherein said manually actuatable input means on the tire includes a portion of an inflation valve assembly.

2. A system as set forth in claim 1, wherein said inflation valve assembly includes a first portion and a second portion, said second portion being movable in relation to said first portion and being said manually actuatable input means.

3. A system as set forth in claim 2, wherein said first portion includes an outer sleeve in an air tight sealing arrangement with the side wall of the tire and said second portion extends through the center of said first portion.

4. A system as set forth in claim 1, wherein the at least one sensed tire condition includes tire temperature.

5. A system as set forth in claim 1, wherein the at least one sensed tire condition includes rotational direction of the tire.

6. A method of communicating information within a tire condition monitoring system for a vehicle that has a tire, said method comprising the steps of:

inputting, via an input means, update identification information for a tire condition sensor unit located within the tire by manually actuating a portion of the input means located on the exterior of the tire;

holding the input update identification information at the tire condition sensor unit;

sensing a tire condition via operation of the tire condition sensor unit;

transmitting a signal from the tire condition sensor unit, the transmitted signal indicating the held update identification information and the sensed tire condition; and receiving the transmitted signal at a location on the vehicle;

wherein said step of inputting update identification information via input means includes the step of actuating a portion of an inflation valve assembly.

7. A method as set forth in claim 6, wherein said step of actuating a portion of the inflation value assembly includes the step of moving the portion relative to a remainder of the inflation valve assembly so as to actuate a switch operatively connected to said tire condition sensor unit.

8. A method as set forth in claim 6, wherein the step of sensing a tire condition includes the step of sensing tire temperature.

9. A method as set forth in claim 6, wherein the step of sensing a tire condition includes the step of sensing rotational direction of the tire.

10. A tire condition communication system for a vehicle that has a tire, said system comprising: a tire condition sensing unit associated with the tire, the tire condition sensing unit including a sensor for sensing at least one tire condition and a memory for storing identification information indicative of a location of the tire on the vehicle, said tire condition sensing unit, in response to sensing the at least one tire condition, outputting a first signal that includes the identification information and tire condition information indicative of the at least one tire condition sensed; and a transmitter for outputting a second signal that includes updated identification information indicative of the location of the tire on the vehicle, the tire condition sensing unit receiving the second signal and replacing the identification information stored in said memory with the updated identification information;

wherein said transmitter includes a manually actuatable switch located at the tire and operatively connected to said tire condition sensing unit, said tire condition sensing unit interpreting sequential toggling of said switch to derive the updated identification information.

11. The tire condition communication system of claim 10 wherein said transmitter further includes a portion of an inflation valve assembly of the tire, the portion of the inflation valve assembly engaging said switch, manual actuation of said portion of said inflation valve assembly toggling said switch.

12. A method of communicating information within a tire condition monitoring system for a vehicle having a tire, said method comprising the steps of:

sensing at least one tire condition with a tire condition sensing unit;

storing identification information in the tire condition sensing unit, the identification information being indicative of a location of the tire on the vehicle;

outputting from the tire condition sensing unit a first signal that includes the identification information and tire condition information indicative of the at least one tire condition sensed;

outputting from a transmitter a second signal that includes updated identification information indicative of the location of the tire on the vehicle; and receiving the second signal at the tire condition sensing unit and replacing the identification information stored with the updated identification information;

further including the steps of sequentially toggling a switch located at the tire, the switch being operatively connected to said tire condition sensing unit; and deriving the updated identification information by interpreting said sequential toggling of the switch.

13. A tire condition communication apparatus for a vehicle that has a tire comprising:

a sensor assembly, located within the tire, including a tire condition sensor, a memory for storing identification data, a transmitter, and a manually actuated input means for inputting the identification data, which extends to the exterior surface of the tire;

A receiver, located within the vehicle, for receiving tire condition information from said sensor assembly;

wherein said input means extends to the exterior of the tire through an inflation valve.

* * * * *